United States Patent
Allen et al.

(10) Patent No.: US 12,104,110 B2
(45) Date of Patent: Oct. 1, 2024

(54) FIRE-RETARDANT MATERIALS

(71) Applicants: Unigel IP Limited, Central (HK); Unigel Limited, East Sussex (GB)

(72) Inventors: Scott William Allen, Central (HK); Mohammad Karimi, Central (HK); Zhihong Cai, Central (HK); Ivan Alexander Tory, Central (HK)

(73) Assignees: Unigel Limited (GB); Unigel IP Limited, Hong Kong (HK)

( * ) Notice: Subject to any disclaimer, the term of this patent is extended or adjusted under 35 U.S.C. 154(b) by 932 days.

(21) Appl. No.: 17/044,219

(22) PCT Filed: Apr. 12, 2019

(86) PCT No.: PCT/EP2019/059574
§ 371 (c)(1),
(2) Date: Sep. 30, 2020

(87) PCT Pub. No.: WO2019/201818
PCT Pub. Date: Oct. 24, 2019

(65) Prior Publication Data
US 2021/0024827 A1    Jan. 28, 2021

(30) Foreign Application Priority Data

Apr. 16, 2018 (GB) .................................. 1806186

(51) Int. Cl.
| | | |
|---|---|---|
| C08K 3/14 | (2006.01) | |
| C08K 3/016 | (2018.01) | |
| C08L 53/02 | (2006.01) | |
| C08L 91/00 | (2006.01) | |
| C09K 21/02 | (2006.01) | |
| C09K 21/14 | (2006.01) | |
| C10M 105/00 | (2006.01) | |
| H01B 7/295 | (2006.01) | |
| H01B 11/00 | (2006.01) | |

(52) U.S. Cl.
CPC .............. *C09K 21/14* (2013.01); *C08L 91/00* (2013.01); *C09K 21/02* (2013.01); *H01B 7/295* (2013.01); *C08L 53/025* (2013.01); *C08L 2201/02* (2013.01); *C08L 2201/56* (2013.01); *C08L 2207/32* (2013.01); *H01B 11/00* (2013.01)

(58) Field of Classification Search
CPC ......... C09K 21/02; C09K 21/14; C08L 53/00; C08L 53/005; C08L 53/02; C08L 91/00
See application file for complete search history.

(56) References Cited

U.S. PATENT DOCUMENTS

| | | | |
|---|---|---|---|
| 4,701,016 A | * | 10/1987 | Gartside, III ........ G02B 6/4401 385/100 |
| 2008/0233299 A1 | | 9/2008 | Kaltenegger et al. |
| 2010/0087079 A1 | | 4/2010 | Pyun et al. |
| 2010/0273925 A1 | | 10/2010 | Allmendinger et al. |
| 2010/0307822 A1 | | 12/2010 | Schmidt |
| 2012/0129962 A1 | | 5/2012 | Ellsworth et al. |

FOREIGN PATENT DOCUMENTS

| | | | |
|---|---|---|---|
| CN | 1969004 A | | 5/2007 |
| CN | 101305029 A | | 11/2008 |
| CN | 101835832 A | | 11/2008 |
| CN | 101868496 A | | 10/2010 |
| CN | 102005263 A | | 6/2011 |
| CN | 103540075 A | | 7/2012 |
| CN | 104725696 A | | 11/2014 |
| CN | 104749724 A | | 1/2015 |
| CN | 108034266 A | | 5/2018 |
| JP | 2841737 B2 | * | 12/1998 |
| WO | WO2014020007 A1 | * | 2/2014 |

OTHER PUBLICATIONS

Irganox 1010 data sheet (Year: 2015).*
The Indian Examination Report issued on Dec. 23, 2022 for IN Application No. 202037043443; pp. 1-6.
The Brazilian preliminary office action issued on Feb. 23, 2023 for Brazilian application No. 112020021203-2; pp. 1-4.
Google Translate—Machine translation of Prior Art-Based Rejections in Brazilian preliminary office action for Brazilian application No. 112020021203-2; pp. 1-2.
The International Search Report and Written Opinion issued for International Patent Application No. PCT/EP2019/059574 on Jul. 16, 2019; pp. 1-8.
The UKIPO Search Report issued for GB1806186.1 on Nov. 30, 2018; pp. 1-2.
Introduction to Building Fire Safety Engineering (2nd Edition), edited by Huo Ran et al., Press of University of Science and Technology of China, pp. 155-161, Sep. 2009 (English Translation).
First Office Action issued on CN201980025861.6, English translation.

* cited by examiner

*Primary Examiner* — Marc S Zimmer
*Assistant Examiner* — Jeffrey S Lenihan
(74) *Attorney, Agent, or Firm* — Bell & Manning, LLC

(57) ABSTRACT

A fire-retardant material comprising from 25 to 50 wt % base oil, from 0.5 to 2.5 wt % polymer, from 0.1 to 1.0 wt % antioxidant, and from 50 to 75 wt % flame retardant.

14 Claims, No Drawings

FIRE-RETARDANT MATERIALS

CROSS REFERENCE TO RELATED APPLICATIONS

This application is a National Stage of International Application No. PCT/EP2019/059574. filed Apr. 12, 2019, which claims the benefit of GB Patent Application No. GB1806186.1, filed Apr. 16, 2018, the contents of which are herein incorporated by reference.

The present invention relates to fire-retardant materials, in particular gels, such as for use in cables, especially telecommunications cables, for example, fiber-optic cables, and products formed therewith.

Various fire-retardant materials exist, such as the applicant's Unigel FR gels, but there is an increasing requirement for improved materials, both in terms of cost and performance, and in terms of compatibility with new product materials being developed.

Preferred embodiments of the present invention will now be described hereinbelow, by way of example only.

The fire-retardant material comprises from 25 to 50 wt % base oil, from 0.5 to 2.5 wt % polymer, from 0.1 to 1.0 wt % antioxidant, and from 50 to 75 wt % flame retardant.

In one embodiment the base oil is an iso-paraffinic white oil, such as Risella X™ (as supplied by Shell Deutschland Oil GmbH, Hamburg, Germany).

In a preferred embodiment the base oil is Risella X430™.

In one embodiment the base oil is a hydro-treated neutral base oil, such as Paraflex HT™ (as supplied by Petro-Canada Lubricants Inc., Ontario, Canada).

In a preferred embodiment the base oil is Paraflex HT100™.

In another embodiment the base oil could be a Group II base oil, such as PURITY™ (as supplied by Petro-Canada Lubricants Inc., Ontario, Canada).

In another embodiment the base oil could be a Group II base oil, such as PURITY PC1810™.

In one embodiment the polymer is a linear di-block co-polymer.

In this embodiment the polymer is a styrene-based di-block co-polymer.

In this embodiment the polymer is a di-block styrene ethylene/propylene co-polymer, such as KRATON G1701 or G1702™ (as supplied by Kraton Corporation, Houston, Tex.), which is in the form of a powder.

In another embodiment the polymer could be a styrenic-based thermoplastic rubber, such as SEPTON 1020™ (as supplied by Kuraray Co., Ltd., Tokyo, Japan).

In one embodiment the material comprises from 0.1 to 0.5 wt % antioxidant.

In this embodiment the antioxidant is a phenolic antioxidant having a molecular weight of from 400 g/mol to 1200 g/mol, such as IRGANOX™ (as supplied by BASF GmbH, Ludwigshafen, Germany).

In a preferred embodiment the antioxidant is IRGANOX L115™.

In one embodiment the flame retardant is a metal hydroxide, a metal oxide or a metal silicate, or a combination of one or more of a metal hydroxide, a metal oxide and a metal silicate.

In one embodiment the flame retardant has an average particle size of from 2 to 10 μm, optionally from 2 to 6 μm.

In this embodiment the flame retardant is aluminium hydroxide, here aluminium trihydroxide, such as MARTINAL™ (as supplied by Martinswerk GmbH, Bergheim, Germany).

In a preferred embodiment the flame retardant is aluminium trihydroxide MARTINAL™ ON904 or ON908.

In another embodiment the flame retardant could be calcium hydroxide.

In one preferred embodiment production of the fire-retardant material is done using mixers, here batch mixers, in two mixing phases using two separate process tanks.

In a first phase a master batch is prepared containing the base oil, the polymer and the antioxidant. In a second phase the master batch is mixed with the flame retardant.

In one embodiment the mixers are turbine and plough mixers.

In the process, in this embodiment for a 1850 kg batch, the following steps are performed:

Base Oil Preparation

1. A predetermined quantity of the base oil, in this embodiment 691.9 kg (37.4 wt %), is added to a heating vessel.
2. The heating vessel is heated to a first pre-set temperature, in this embodiment 90° C.
3. A predetermined quantity of the anti-oxidant, in this embodiment 2.775 kg (0.5 wt %), is then added to the heating vessel.
4. The heating vessel is then heated to a second pre-set temperature, in this embodiment 110° C.

First Mixing Phase

5. The heated batch of the base oil and the anti-oxidant is then added to a first process vessel, which has a turbine mixer (Greaves GFLH 370, as supplied by Joshua Greaves & Sons Ltd, Bury, UK) and a shear mixer (Greaves GM25, as supplied by Joshua Greaves & Sons Ltd, Bury, UK).
6. A predetermined quantity of the polymer, in this embodiment 27.75 kg (1.5 wt %), is then added to the first process vessel.
7. The turbine and shear mixers are then set to operate at 45 Hz for a predetermined period, in this embodiment from 60 to 90 minutes, in order to achieve complete dissolution of the polymer, with the resulting material being in the form of a gel.

Second Mixing Phase

8. The gel is then added to a second process vessel, which is a plough shear mixer having a low-shear/high-shear setup (LDH-2, as supplied by Shengli Machinery Co, Ltd, Shanghai, China).
9. A predetermined quantity of the flame retardant, in this embodiment 1121.1 kg (60.6 wt %), is then added to the second process vessel.
10. The turbine and shear mixers are then set to operate at 45 Hz for a predetermined period, in this embodiment from 60 to 90 minutes, in order to achieve complete dissolution of the polymer, with the resulting material being in the form of a gel.
11. The plough shear mixer is first set to run at speed 1, with all dispensers running, for a predetermined period, in this embodiment about 60 minutes, until homogeneous.
12. The plough shear mixer is then set to run at speed 2, with an applied vacuum, for a predetermined period, in this embodiment about 30 minutes, until de-aerated.

The present invention will now be described with reference to the following non-limiting Examples.

| Example | Base Oil (wt %) HT100 | Base Oil (wt %) PC1810 | Base Oil (wt %) Risella 430 | Polymer (wt %) G1701 | Antioxidant (wt %) L115 | Fire Retardant (wt %) ON904 | Fire Retardant (wt %) ON908 | Viscosity at 25° C., 10 s$^{-1}$ (Pa·s) |
|---|---|---|---|---|---|---|---|---|
| DC073 | 32.5 | | | 2 | 0.5 | | 65 | 50.73 |
| DC083 | | 37.4 | | 1.5 | 0.5 | | 60.6 | 9.76 |
| DC084 | | 33 | | 1.5 | 0.5 | | 65 | 13.6 |
| DC085 | | 28 | | 1.5 | 0.5 | | 70 | 44.8 |
| DC086 | | 32.5 | | 2 | 0.5 | | 65 | 33.36 |
| DC087 | | 36.9 | | 2 | 0.5 | | 60.6 | 17 |
| IT068 | 37.4 | | | 1.5 | 0.5 | | 60.6 | 23.37 |
| IT071 | 47.4 | | | 1.5 | 0.5 | | 50.6 | 5.75 |
| IT072 | 27.4 | | | 1.5 | 0.5 | | 70.6 | 77.93 |
| IT100 | | | 27.4 | 1.5 | 0.5 | | 70.6 | 39.29 |
| ZC006 | 27.4 | | | 1.5 | 0.5 | 70.6 | | 228 |
| ZC009 | 31.75 | | | 0.75 | 0.5 | 67 | | 81.8 |
| ZC019 | | | 28.9 | 0.6 | 0.5 | 70 | | 113.2 |

Finally, it will be understood that the present invention has been described in its preferred embodiments and can be modified in many different ways without departing from the scope of the invention as defined by the appended claims.

The invention claimed is:

1. A fire-retardant material comprising from 25 to 50 wt% base oil, from 0.5 to 2.5 wt % polymer, from 0.1 to 1.0 wt % antioxidant, and from 50 to 75 wt % flame retardant, wherein the flame retardant is a metal hydroxide, a metal oxide or a metal silicate, or a combination of one or more of a metal hydroxide, a metal oxide and a metal silicate, and wherein the polymer is a linear di-block co-polymer.

2. The material of claim 1, wherein the base oil is an iso-paraffinic white oil.

3. The material of claim 1, wherein the base oil is a hydro-treated neutral base oil.

4. The material of claim 1, wherein the base oil is a Group II base oil.

5. The material of claim 1, wherein the polymer is a styrene-based di-block co-polymer.

6. The material of claim 5, wherein the polymer is a di-block styrene ethylene/propylene co-polymer.

7. The material of claim 1, comprising from 0.1 to 0.5 wt % antioxidant.

8. The material of claim 1, wherein the antioxidant is a phenolic antioxidant having a molecular weight of from 400 g/mol to 1200 g/mol.

9. The material of claim 1, wherein the flame retardant has an average particle size of from 2 to 10 μm, optionally from 2 to 6 μm.

10. The material of claim 1, wherein the flame retardant is aluminium hydroxide, optionally aluminium trihydroxide.

11. The material of claim 1, wherein the flame retardant is calcium hydroxide.

12. A product incorporating the material of claim 1.

13. The product of claim 12, wherein the product is a cable.

14. The product of claim 13, wherein the cable is a telecommunications cable.

* * * * *